US009085044B2

(12) United States Patent
Ziegler

(10) Patent No.: US 9,085,044 B2
(45) Date of Patent: *Jul. 21, 2015

(54) METHOD AND WELDING APPARATUS FOR THE DETERMINATION OF THE STRENGTH OF THE WELDING CURRENT TO BE USED IN THE WELDING OF CONTAINER BODIES

(75) Inventor: Patrick Ziegler, Zufikon (CH)

(73) Assignee: Soudronic AG, Bergdietikon (CH)

( * ) Notice: Subject to any disclaimer, the term of this patent is extended or adjusted under 35 U.S.C. 154(b) by 1482 days.

This patent is subject to a terminal disclaimer.

(21) Appl. No.: 12/424,042

(22) Filed: Apr. 15, 2009

(65) Prior Publication Data

US 2009/0261076 A1 Oct. 22, 2009

(30) Foreign Application Priority Data

Apr. 17, 2008 (CH) .................................... 605/08

(51) Int. Cl.
*B23K 11/00* (2006.01)
*B23K 9/10* (2006.01)
*B23K 11/24* (2006.01)
*B23K 9/09* (2006.01)
*B23K 9/12* (2006.01)
*B23K 11/25* (2006.01)
*B23K 11/087* (2006.01)
*B23K 11/06* (2006.01)

(52) U.S. Cl.
CPC ............. *B23K 11/257* (2013.01); *B23K 11/066* (2013.01); *B23K 11/0876* (2013.01);
(Continued)

(58) Field of Classification Search
CPC .. B23K 11/062; B23K 11/0873; B23K 11/24; B23K 11/252; B23K 11/248; B23K 11/241; B23K 11/25; B23K 11/257; B23K 11/251; B23K 9/1056; B23K 9/092; B23K 2201/06
USPC .................. 219/59.1, 65, 108, 109, 110, 111, 219/130.32, 130.33, 137 PS
See application file for complete search history.

(56) References Cited

U.S. PATENT DOCUMENTS 3,573,416 A * 4/1971 Drechsler ...................... 219/608
3,586,815 A * 6/1971 Van Eijnsbergen et al. .... 219/90
(Continued)

FOREIGN PATENT DOCUMENTS

| EP | 0502478 A2 | 9/1992 |
| EP | 0761368 A1 | 3/1997 |
| FR | 2696369 A1 | 4/1994 |

OTHER PUBLICATIONS

European Search Report for EP09005412 dated Dec. 28, 2010.
European Search Report for EP09005413 dated Jan. 18, 2011.

*Primary Examiner* — Dana Ross
*Assistant Examiner* — Hemant Mathew
(74) *Attorney, Agent, or Firm* — McCormick, Paulding & Huber LLP

(57) ABSTRACT

For the determination of the welding current to be used for the resistance welding of the overlap seam of container bodies, welding with a test body is carried out with a changing strength of welding current which in the test body produces a varying welding of the seam. The current strength varies from welding of this seam with a too high temperature to welding with a too low temperature. Along with this the welding current strength used in the welding is determined so that it is further determined at which point of the seam the welding has been accomplished and with what strength of welding current. By means of a mechanical and/or optical investigation of the welded seam it can then be easily determined where the seam has been correctly welded for the series production of container bodies from the same sheet material as the test bodies. When such a point or such a region of the seam is known the welding current used in the test welding can be taken as the welding current for serial production.

11 Claims, 2 Drawing Sheets

(52) U.S. Cl.
CPC .............. *B23K 9/092* (2013.01); *B23K 11/062* (2013.01); *B23K 11/24* (2013.01); *B23K 11/248* (2013.01); *B23K 2201/125* (2013.01)

(56) References Cited

U.S. PATENT DOCUMENTS

| | | | |
|---|---|---|---|
| 4,376,883 A | 3/1983 | Dao et al. | |
| 4,503,312 A * | 3/1985 | Nakata et al. | 219/117.1 |
| 5,015,815 A * | 5/1991 | Matuschek et al. | 219/110 |
| 5,064,982 A * | 11/1991 | Kabasawa et al. | 219/64 |
| 5,237,147 A | 8/1993 | Pazzaglia | |
| 5,532,452 A * | 7/1996 | Lechner et al. | 219/124.34 |
| 6,414,261 B1 * | 7/2002 | Maetschke | 219/109 |
| 6,927,360 B2 * | 8/2005 | Artelsmair et al. | 219/124.22 |
| 7,291,803 B2 * | 11/2007 | Karakas | 219/110 |
| 8,278,583 B2 * | 10/2012 | Mueller et al. | 219/59.1 |
| 2006/0073353 A1 * | 4/2006 | Rehse | 428/586 |

\* cited by examiner

METHOD AND WELDING APPARATUS FOR THE DETERMINATION OF THE STRENGTH OF THE WELDING CURRENT TO BE USED IN THE WELDING OF CONTAINER BODIES

CROSS REFERENCE TO RELATED APPLICATION

This application claims the priority of Swiss patent application No. 0605/08, filed on Apr. 17, 2008 the disclosure of which is incorporated herein by reference in its entirety.

BACKGROUND OF THE INVENTION

The invention concerns a method for determining the strength of the welding current to be used for the resistance seam welding of container bodies sequentially following one another. The invention also concerns a welding apparatus for the resistance seam welding of container bodies, with welding rolls, a welding current generator and a welding current control. The invention further concerns a method for the resistance seam welding of container bodies with nonuniform overlapping as well as a welding apparatus for the resistance seam welding of container bodies with nonuniform overlapping.

STATE OF THE ART

For setting the strength of the welding current for the resistance seam welding of container bodies it is customary to carry out the test welding of a small series of bodies made of the sheet material to be welded in the case at hand, wherein as in production the customarily used welding alternating current is used at a constant current strength. The welded bodies of such small series are then investigated by mechanical strength checking (for example by tearing open the welding overlapped seam) and by visual checking. If the welding current strength in the case of the test welding was set too low, or if the welding temperature was too low, the seam can too easily become broken open, since an insufficient material melting was achieved, which is also designated as "adhesion". On the other hand if the welding current strength in the case of the test welding was set to too high, there results a welding with a too high temperature, and craters exist in the welding region and liquid container body or welding electrode material becomes deposited as spatter along the seam. This can make the body unfit for further use. After such test weldings, in the case of which the operating person as a rule creates test bodies with "adhesion" welded seams as well as test bodies with welded seams with spatter, the welding current strength is then determined for use in the serial production of bodies from the involved type of sheet material. In this case the welding current strength is set to be in the region between "adhesion" and "spattering" with a spacing of about ⅔ from the low value, and accordingly with a spacing of about ⅓ from the high value. With this iterative procedure the amount of time and the amount of material consumed by the test series are strongly dependent on the size of the welded region of the body material and on the experience of the person operating the body welding machine.

SUMMARY OF THE INVENTION

The invention has as its object the provision of a better, and thereby as a rule faster and in any event material-sparing, method for the determination of the appropriate welding current strength. Further the invention has as its basis the object of providing a welding apparatus for carrying out said method.

The object in the case of the above mentioned method is solved in that at least one test body is welded while during the welding a decreasing or an increasing current strength is used, and in that in said welding it is determined where on the seam which welding current strength has been active. The object in the case of the above mentioned welding apparatus is further solved in that by the control and welding current generator the welding current strength during the welding of the seam of a container body is changeable and its value along the length of the seam of the body is determinable and thereby storable in a memory.

The test body accordingly exhibits a seam which along its seam length has been welded with different high welding current strengths. An entire current strength region, which preferably comprises the region from "adhesion" to the creation of "spatter", can be "mapped" from this one body or at most from two bodies. The mechanical and optical, especially the visual, investigation of this body shows thereby, as a rule, that along its seam is a seam region which has been welded with an appropriate strength of welding current. If this is not the case, then a second test body with a different current strength region can be produced in accordance with the method of the invention. Then, since the welding current strength is known as to the value which has been applied along the length of the seam, from the position of the correctly welded region of the test body the corresponding welding current strength can be determined, and within that correctly welded region a spot on the seam can be chosen (for example a spot which divides the correctly welded region between "adhesion" and "spattering" in a ratio of 2/3 to 1/3), and the welding current strength which was effective at this spot can be determined, especially as read off from of the ramp of the welding current characteristic or as read out from the memory. This welding current strength can then be taken as the determined welding current strength to be used for the serial production welding at a constant current strength value.

In a preferred embodiment the current strength variation along the seam of the test body is not steady but instead has at least one inflexion point with different slopes on both sides of the inflexion point. In regard to the test body this allows that in the region of the higher welding current strength a lower slope of the current strength change is used and that in the region of the smaller welding current strength a steeper slope of the welding current strength change is used. This provides a better recognition of the "spatter" boundary and of a good tearing open capability of the seam in the "adhesion" region. Preferably the welding starts with a high current strength, and accordingly the welding current strength falls in going along the length of the seam. It is further preferred that the welding current is first started at a predetermined spacing, for example 5 to 10 millimeter, from the beginning of the body, so that possible vibrations of the welding rolls, or jitter effects, do not falsify the measurement of the welding current strength along the seam.

According to a further aspect of the invention, in the case of welding a production series of container bodies, by electrical resistance seam welding, where the container bodies have a nonuniform overlapping it is seen to that in the production welding of each such body along the length of its seam a falling or rising welding current strength is used. This permits a welding in the regions with higher overlapping with higher current strength in comparison to a welding in regions with smaller overlapping of the body edges, where then the welding takes place with lower current strength. The determination of the optimal welding current strength curve takes place preferably with the method according to the above first aspect of the invention. Accordingly with this method (therefore with falling or rising welding current strength) for two or more bodies with differing overlapping the optimal current strength values for the welding in the region of larger overlapping and for welding in the region of lesser overlapping are determined. The welding current strength for production is then chosen as a rule to be a ramp shaped current strength curve which connects these two current values. The second aspect of the invention also includes a suitable welding apparatus for carrying out this method.

BRIEF DESCRIPTION OF THE DRAWINGS

In the following, exemplary embodiments of the different aspects of the invention are explained in more detail with the aid of the drawings. The drawings show.

DESCRIPTION OF PREFERRED EMBODIMENTS

Figure 1:
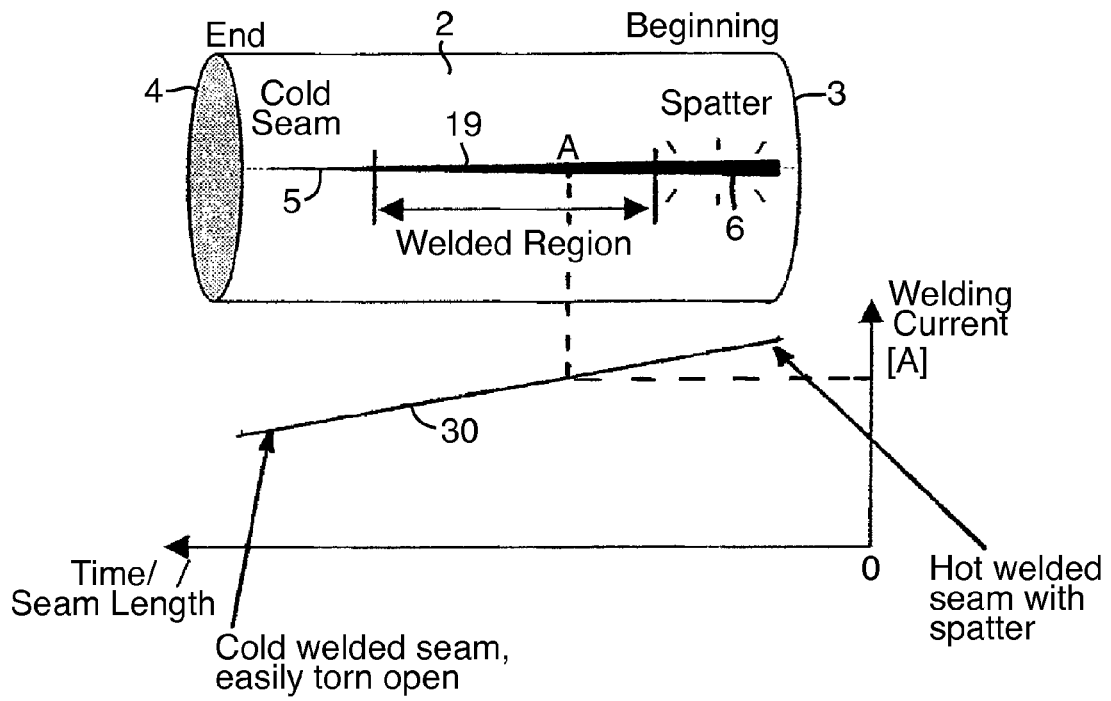
FIG. 1—a schematic view of a welded seam of a container body and the curve of the welding current strength (for example in amperes) with respect to the length of the seam or with respect to time.

FIG. 1 shows schematically a test container body 2, which serves for the determination of the appropriate welding current strength value to be used for the serial production of bodies made from the same sheet material as the test body, above a diagram which illustrates the welding current strength along the length of the seam of the test body 2, or correspondingly in respect to the time needed for the welding. The test body 2 is welded on a resistance seam welding machine or roller seam welding machine, which is explained in more detail in connection with FIG. 3. According to the invention now the strength of the welding current during the test welding of the body 2 along the overlapped welding seam is varied so as to fall or rise. In the illustrated example the welding current strength 30 falls during the time of the welding, or along the length of the seam, and accordingly diminishes from a starting value to an ending value. The welding current in this case, as in known ways for container body welding, is an alternating current, and as a rule has a higher frequency then the frequency of the power supply voltage, as is known to persons skilled in the art and is not here explained further. It is new however, that in the welding of the test body the strength of the welding current applied to the overlapped seam of the test body is varied. Accordingly, along the length of the welded seam of the test body 2 from its beginning 3 to its end 4 (with reference to the transport direction of the body) an overlapped welding seam is created with a region 6 formed with a too high welding temperature and containing the appearance of "spattering", as well as with a region 5 formed with a too low welding temperature and at which a cold welding seam or so called "adhesion" seam is created having an insufficient amount of welding. Between these regions 6 and 5, there then lies, because of the variation of the welding current strength, a welding region 19 in which a welding without spattering and with a sufficient welding temperature is created. In the illustration the higher welding current strength is used at the beginning of the body and the welding current 30 or its strength falls to the end of the seam or to the end 4 of the body. Of course a reverse process is also a possible in which a lower welding current strength is used at the beginning 3 of a body and in which the welding current strength increases along the length of the seam. Then the region 5 would be found at the beginning 3 of the body and the spatter region 6 would be found at the end 4 of the body. Between those points again a correct welded region 19 would be formed. Accordingly, by way of the invention a test body 2 can be formed which in the seam of a test body 2 there is represented an entire welding current region extending from too high a current welding strength to too low a welding current strength. Should the operating person have falsely chosen the beginning setting of the welding current strength so that this imaging is not produced, as the case may be, it is possible to carry out a further test body with a lower or higher value of the beginning welding current strength so that in the illustrated diagram of the welding current strength the ramp is moved parallel downwardly or upwardly. In any event the steepness of the welding current strength 30 along the length of the seam, or in respect to the welding time, can be adjusted, as in indeed is preferred if a pregiven steepness of the ramp is input into the control. If a test body 2 is produced in accordance with FIG. 1 and having the seam areas 6, 5 and 19, then on the basis of an optical or visual examination of the presence of spattering the boundary between the region 6 and the region 19 can be determined. Further in a known way by the tearing open of the seam from the end 4 the region 5 can be determined and this above all can be supplemented by an optical or visual inspection. In this way the boundary between the region 5 and the region 19 is determined. The welding current strength to be used for the production of containers from the same sheet material as used for the test body can then be found to lie in the welded region 19. This is possible since in the formation of the test body the welding current strength 30 along the length of the seam has been determined. This can be done by an actual measurement of welding current strength along the seam during the welding of the test body and the storing of the measured values, so that the actual welding current strength corresponds to the determined welded current strength. This can also be done in that in the control is arranged a pregiven ramp-shaped desired curve for the welded current strength along the seam, or with respect to time, so that not a measured value but a pregiven value for the welding current generator is given. Therefore, if for the test body 2 the good welding region 19 has been determined, and if a welding is desired as is present for example at the point A of the region 19, which is found, for example, by dividing into three the length of the region 19, and fixing the point A at a distance of one third from the boundary between the areas 19 and 6, so how large the current strength at the welding at point A should also remain fixed with the distance of the point A from the beginning of the body or from the beginning of the application of the welding current. This welding current strength at the point A, determined as said by measurement or by way of the predetermined current strength along the welding seam, which can for example be called up, by the input of the seam length from the beginning of the body 3 to the point A, from the measured-value memory or from the pregiven value of the ramp contained in the memory, since according to the invention the current strength values along the length of the seam have been determined. Accordingly, by a simple length measurement, using a measuring rule, the body length from the beginning 3 to the point A can be determined, and from it the current strength suitable for production usage can be determined. This can then be set into the welding machine for serial production or can be directly taken from the memory, in which memory the findings resulting from the test welding have been stored or in which the preset desired values along the seam have been stored. Since the seam length and time stand in fixed relation to one another for the pregiven welding speed of the welding machine, in the acquisition either the welding time or the seam length can be determined, either by way of the rotational angle of the welding rolls during the welding of the test body 2 or by way of the used length of the intermediate wire electrode 11, 12 (FIG. 3).

In a preferred embodiment the procedure is such that the high current is used at the beginning, as is illustrated in FIG. 1. Further, it is preferred that the current is first applied after the start of the appearance of the body at the welding rolls, and indeed most preferably about 5-10 mm beyond the beginning 3 of the body 3, so that possible transient starting movements or fault containing synchronization adjustments in the measurement of the welding current cannot have any influence. The welding machine can for this be equipped with a detector for detecting the body beginning 3, as will be explained later. Preferably the welding current is further turned off shortly before the end 4 of the body 2. This simplifies the tearing open of the seam for the mechanical inspection.

Figure 2:
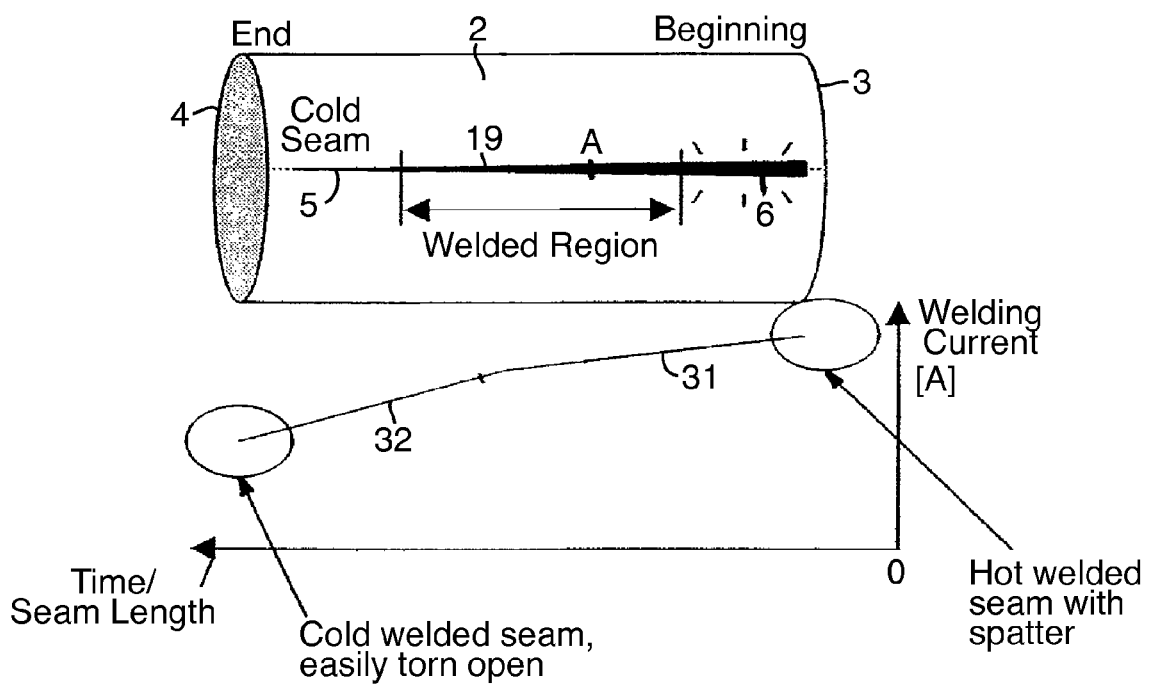
FIG. 2—a further schematic illustration of a welded seam of a container body and the curve of the welding current strength, for explaining a preferred embodiment of the invention.

FIG. 2 shows a further preferred embodiment for which the preceding explanations also serve. Similar reference numbers indicate again similar elements. In the case of this embodiment the welding takes place not with a constantly falling or constantly rising current 30, but with a current curve which has at least two different slopes and a corresponding inflection point (as illustrated) or has several inflection points. In FIG. 2 two sections 31 and 32 of the current strength which occur along the seam or with respect to time are illustrated. In the region of the higher current the slope of the decreasing ramp is less and in the region of lower current 32 the slope is larger. In this way it can be achieved that the spatter boundary on the seam between the regions 6 and 19 is visible with a higher resolution and the seam at the end 4 can nevertheless be well torn open to ascertain the region 5.

Figure 3:
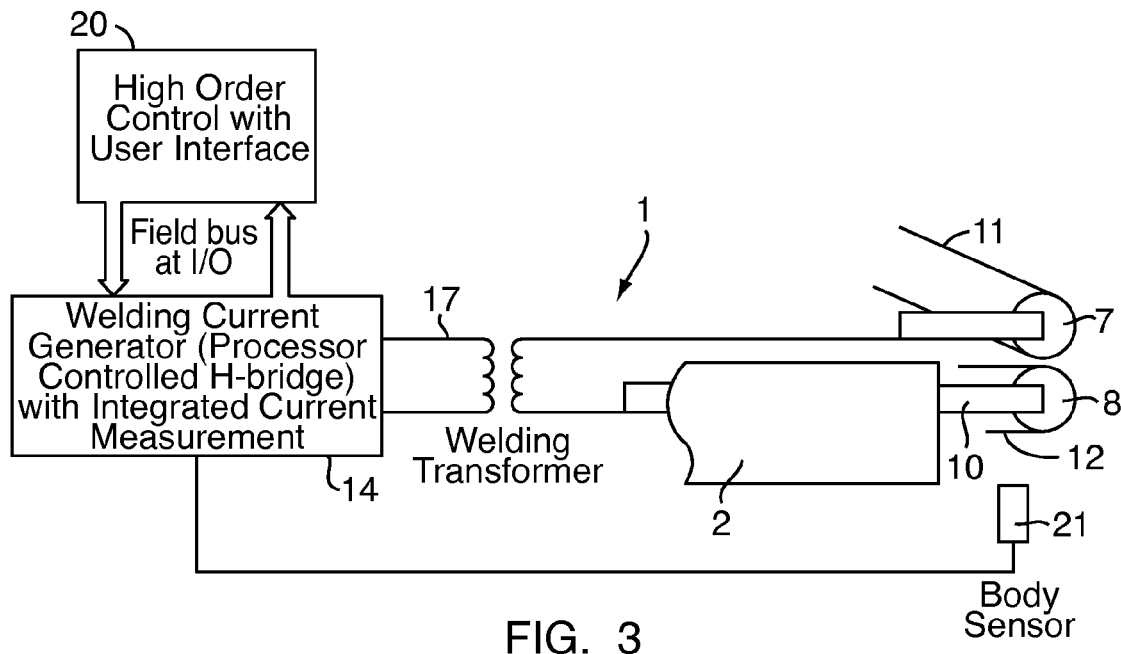
FIG. 3—a schematic illustration of a welding apparatus for the resistance seam welding of container bodies according to the aspects of the invention.

FIG. 3 shows schematically a resistance seam welding machine or roll seam welding machine 1 which includes two welding rolls 7 and 8, between which the seam of body 2 is welded in a known way. Intermediate wire electrodes 11 and 12 can run on the welding rolls. The lower welding roll 8 is supported on a welding arm 10 and is supplied by the conductor 15 from the welding current generator 14 through the welding transformer 17. By a sensor 21, especially a noncontactingly operating sensor, or by a detection system integrated in the welding current generator it can be determined when the body 2 is located between the welding rolls. The welding current generator then controls the application of the welding current through the conductor 1 to the upper welding roll 7. Thereby, especially, the delayed application of the welding current at a small spacing from the body beginning can be controlled. The controller 20 can further control the welding current generator 14 and can impress on this the desired ramp shaped curve of the welding current strength, which in this case is contained in the control as pregiven values. The ramp shaped curve can however also be set into the welding current generator itself and can be activated by an external signal for the test body welding. A processor controlled welding current generator, which makes possible a process according to the invention is a welding current generator Pulsar or Unisoud from the firm Soudronic, Bergdietikon, Switerzland. The control contains further the welding time for the test body or the welded seam length, as has been previously explained. The control 20 can also further determine the current strength supplied to the welding rolls with respect to time or with respect to the seam length, whether this is done by measurement or by comparison of the welding time or welding seam length with the corresponding desired current strength of the ramp. In FIG. 3 it is illustrated as a variation that the conductors between the control 20 and the generator 14 can also, in opposite direction, deliver a current strength output signal from the generator to the control 20. Alternatively a separate current strength measuring device 26 can be provided which delivers the strength of the welding current to the control whereby this is captured and associated with the welding time or the seam length. Alternatively, the measurement is processed instead with the desired value ramp in the control or in the generator for the test body welding current strength. By the determination of a preferred spot A in the correct welding region 19 of the welding seam of the test body 2 this can then, as explained, be associated with the corresponding welding current strength according to the ramps 30 or 31, 32, which are measured ramps or pregiven desired current strength value ramps. This one current strength value is then from the control 20 used as the welding current desired value for the production series welding of container bodies. Accordingly in known ways with a constant, not falling and not rising, welding current the welding takes place with the determined welding current strength. Thereby the production welded seams lie in the optimal region corresponding to the point A on the welded seam of the test body.

Figure 4:
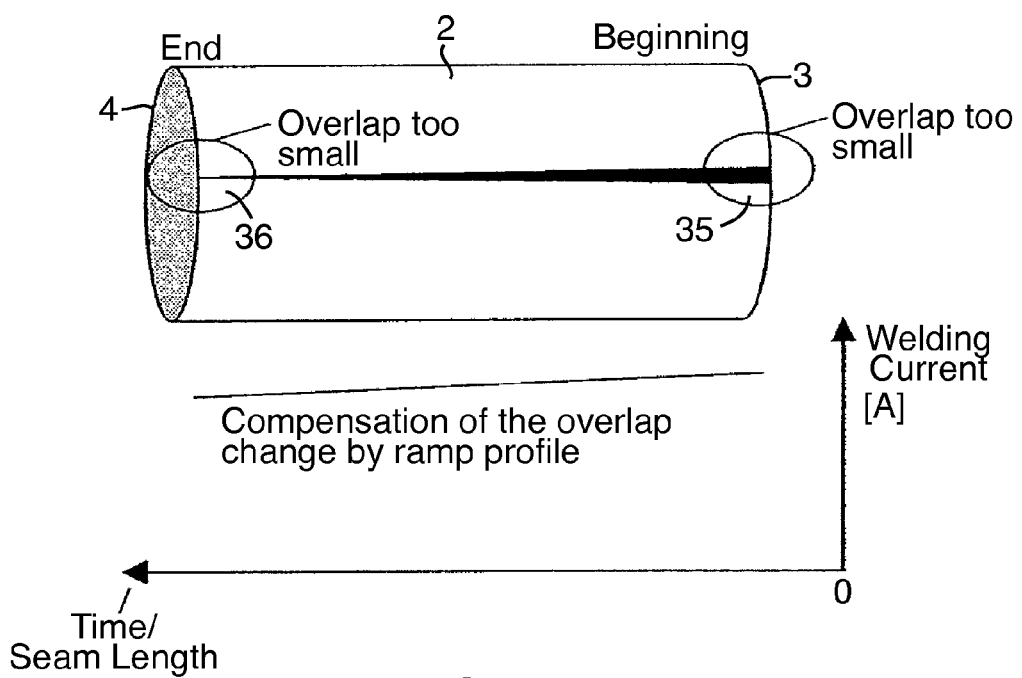
FIG. 4—a further schematic illustration of a welded seam of a container body and the curve of the welding current strength, for explaining the second aspect of the invention.

With reference to FIGS. 3 and 4 a further aspect of the invention can be described, which aspect is explained as a method with reference to FIG. 4, and which method can be carried out with the welding apparatus of FIG. 3. It can happen that in the production of the body blanks, by the cutting of the sheet material and by the rounding of the body blanks, the overlapping edge region of the container body does not run uniformly along the welding seam to be formed. In FIG. 4 a corresponding body is schematically illustrated, wherein at the beginning 3 of the body, at least in the region 35, the body has an overlapping which is too large, and at the body end 4, at least in the region 36, the body has an overlapping which is too small. With customary procedures such container bodies can hardly be welded with sufficient quality, since the constant production welding current strength in the large overlap as a rule provides insufficient energy, so that there a too cold welding is achieved, and on the other hand since the constant welding current strength in the too small overlap supplies too much energy, so that there is seen the effect of welding with a too high temperature and with consequent spattering. According to the second aspect of the invention the procedure is now such that the welding in production takes place with a corresponding decreasing welding current strength, as is illustrated in FIG. 4 beneath the body, where again the welding current strength is shown on the vertical axis and the welding time or seam length is shown on the horizontal axis. If the overlap fault of the container body 2 runs otherwise so that at the beginning 3 a too small overlap is present and at the end 4 a too large overlap is present, then the welding current strength must accordingly run in an increasing manner instead of as shown in FIG. 4, in a falling manner. The welding machine of FIG. 3 is equipped with the control 20 and the welding current generator 14 (which again for example is of the type Pulsar or Unisoud of the firm Soudronic AG, Bergdietikon, Switzerland) corresponding to the second aspect of the invention, so that in series production for each of the bodies which rapidly follow one another a corresponding falling or increasing welding current strength is created along the involved seam.

For the determination of the desired welding current strength at the beginning and at the end of the seam preferably the methods explained in reference to FIGS. 1 to 3 of the first aspect of the invention are used. Therefore with these explained methods, which are used for two or more bodies, for the body start and for the body end with dissimilar overlapping widths, for each end another optimal current is determined. These two current values for the beginning and for the end of the welding seam are then in the serial production of bodies introduced into the welding current ramp profile illustrated in FIG. 4, so that the overlap deviation can be compensated. Again the optimal welding current for the body beginning and the body end can in customary ways be determined by the welding of a series of test bodies with different constant welding currents.

For the determination of the welding current strength for the resistance seam welding of the overlap seam of container bodies in accordance with a first aspect of the invention with a first test body a welding with a changing welding current strength is carried out, which in the case of the test body produces a varied welding of the seam which welding extends from a welding with a too high temperatures to a welding with a too low temperature along the seam. Thereby the welding current strength for the formation of the welding is determined (by measurement or from the presettings) so that it is determined at what spot on the seam the seam has been welded with what welding current. By means of a mechanical and/or optical examination of the welding seam it can then easily be determined where the seam has a correct welding for the serial production of the container bodies made of the same sheet material as the test bodies. When one such location or one such region of the seam is known then the welding current strength determined with the test welding can be used for the serial production wherein the welding takes place with a constant welding current strength.

Even a person operating the resistance seam welding machine and having little experience in welding technology can, with the aid of the invention and without special knowledge about the system characteristics (for example production rate, welding pressure) and about the nature of the sheet material to be processed, in little time make a qualitative statement about where the welding region for the production series lies (minimum, maximum, and optimum welding current strength). Since for the determination only one to two test bodies are needed, the method of the invention requires considerably less time and less material then the customary process.

According to a further aspect of the invention in serial production the welding results in the making of a series of container bodies with a falling or a rising welding current strength curve for each body, so that the bodies with a non-uniform running of the overlap of the body edges can be handled. This permits the welding of such bodies with good welding quality, which in the customary way with constant welding current strength is not possible.

The invention claimed is:

1. A method for determining a welding current strength value to be used for serial production welding of overlapping seams of container bodies following one another in sequence comprising:
    welding at least one test body (2) at an overlapping seam by a welding current having a welding current strength value (30, 31, 32) which rises or falls during the welding;
    determining a correctly welded region of the overlapping seam;
    identifying the welding current strength value at a spot within the correctly welded region; and
    selecting the welding current strength value at the spot as the welding current strength value for the serial production welding of the overlapping seams of the container bodies following one another in sequence.

2. The method according to claim 1, wherein the welding current strength value rises or falls essentially linearly along a length of the overlapping seam of the at least one test body.

3. The method according to claim 2, wherein a curve of the welding current strength value with respect to the length of the overlapping seam of the at least one test body has at least two regions (31, 32) with different slopes.

4. The method according to claim 1, wherein the welding current is first applied at a predetermined spacing from a beginning (3) of the at least one test body.

5. The method according to claim 1, wherein the welding current strength value lies in a region of a curve of the welding current strength value with respect to the seam length between a maximum welding current strength value and a minimum welding current strength value for the seam welding of the at least one test body.

6. The method according to claim 1, wherein the correctly welded region is determined based at least in part on a mechanical examination of the at least one test body, an optical examination of the at least one test body or a visual examination of the at least one test body.

7. A method for determining a welding current to be used for serial production resistance seam welding of overlapping seams of container bodies following one another in succession, comprising:
    welding a seam of an overlapped width of at least one test body using a welding current having a welding current strength which falls or increases during the welding of the seam,
        wherein the overlapped width of the at least one test body changes essentially constantly along a length of the seam of the at least one test body, and a value of the welding current strength at a larger dimension of the overlapped width of the at least one test body is larger than a value of the welding current strength at a smaller dimension of the overlapped width;
    identifying a correctly welded region at the larger dimension of the overlapped width of the at least one test body based at least in part on a mechanical examination of the at least one test body or an optical examination of the at least one test body;
    selecting a first spot within the correctly welded region at the larger dimension of the overlapped width;
    identifying a correctly welded region at the smaller dimension of the overlapped width of the at least one test body based at least in part on a mechanical examination of the at least one test body or an optical examination of the at least one test body;
    selecting a second spot within the correctly welded region at the smaller dimension of the overlap of the seam;
    identifying a first welding current strength value of said welding at said first spot;
    identifying a second welding current strength value of said welding at said second spot; and
    deriving a production welding current strength curve between said first welding current strength value and said second welding current strength value.

8. The method according to claim 7, wherein the welding current strength value is essentially linearly falling or essentially linearly increasing along the length of the seam.

9. The method according to claim 7, wherein the production welding current strength curve has at least two regions (31, 32) with different slopes.

10. The method according to claim 7, wherein the welding current is first applied at a predetermined spacing from a beginning of the at least one test body.

11. The method according to claim 7, wherein the value of the welding current strength is between a maximum welding current strength for the seam of the at least one test body and a minimum welding current strength for the seam of the at least one test body.

* * * * *